W. F. NANNEY.
INSECT EXTERMINATOR.
APPLICATION FILED JUNE 16, 1908.

905,348.

Patented Dec. 1, 1908.
2 SHEETS—SHEET 2.

Witnesses

Inventor
Wiley F. Nanney.
By C. A. Snow & Co.
Attorneys

UNITED STATES PATENT OFFICE.

WILEY FAREST NANNEY, OF BEN FRANKLIN, TEXAS.

INSECT-EXTERMINATOR.

No. 905,348.　　　　Specification of Letters Patent.　　　　Patented Dec. 1, 1908.

Application filed June 16, 1908. Serial No. 438,871.

*To all whom it may concern:*

Be it known that I, WILEY FAREST NANNEY, a citizen of the United States, residing at Ben Franklin, in the county of Delta and State of Texas, have invented a new and useful Insect-Exterminator, of which the following is a specification.

This invention relates to insect destroyers and more particularly to a machine for catching and destroying cotton boll weevils.

It is a well known fact that cotton boll weevils pierce the unripe cotton bolls and deposit their ovum therein, thus rendering the bolls faulty so that the latter soon fall to the ground where they usually remain until the ovum develops.

The object of the present invention is to provide a machine which will gather the affected cotton squares and bolls and deposit the same in a suitable receptacle from which they may be removed and destroyed.

A further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

Figure 1:
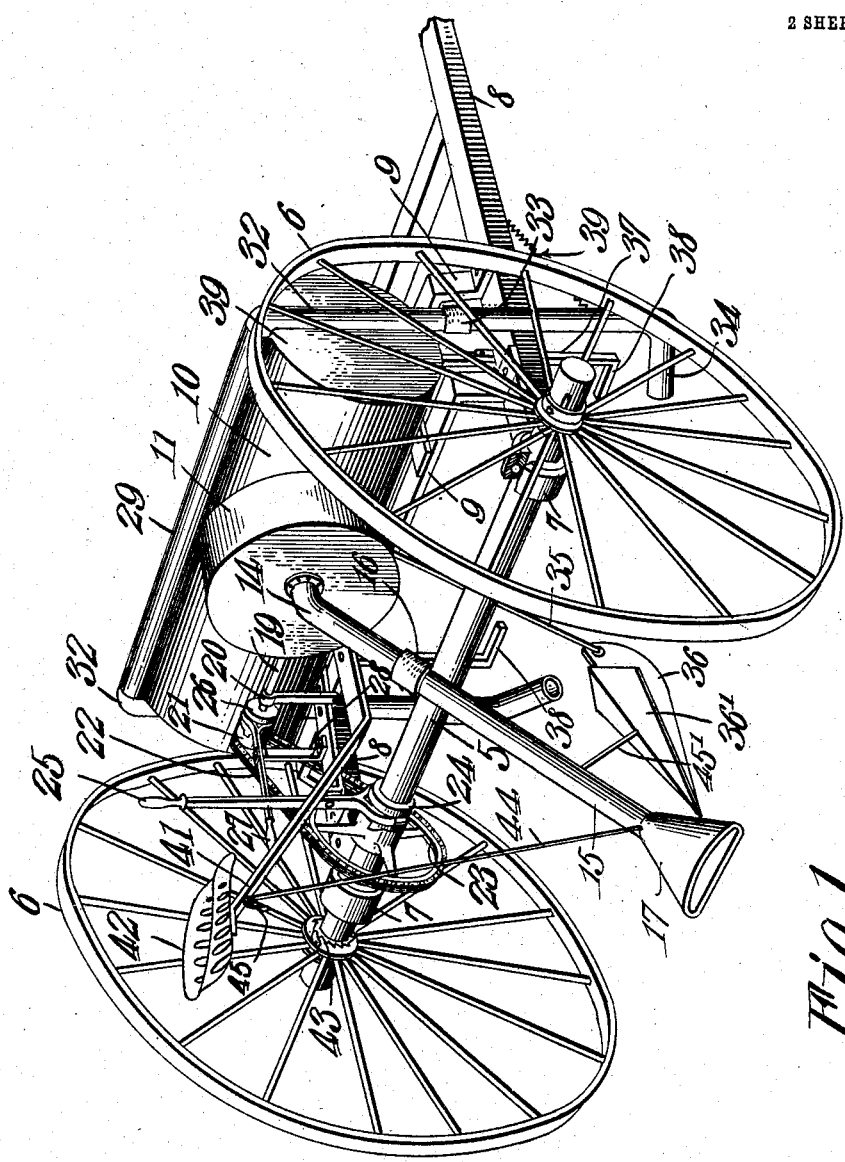
Figure 2:
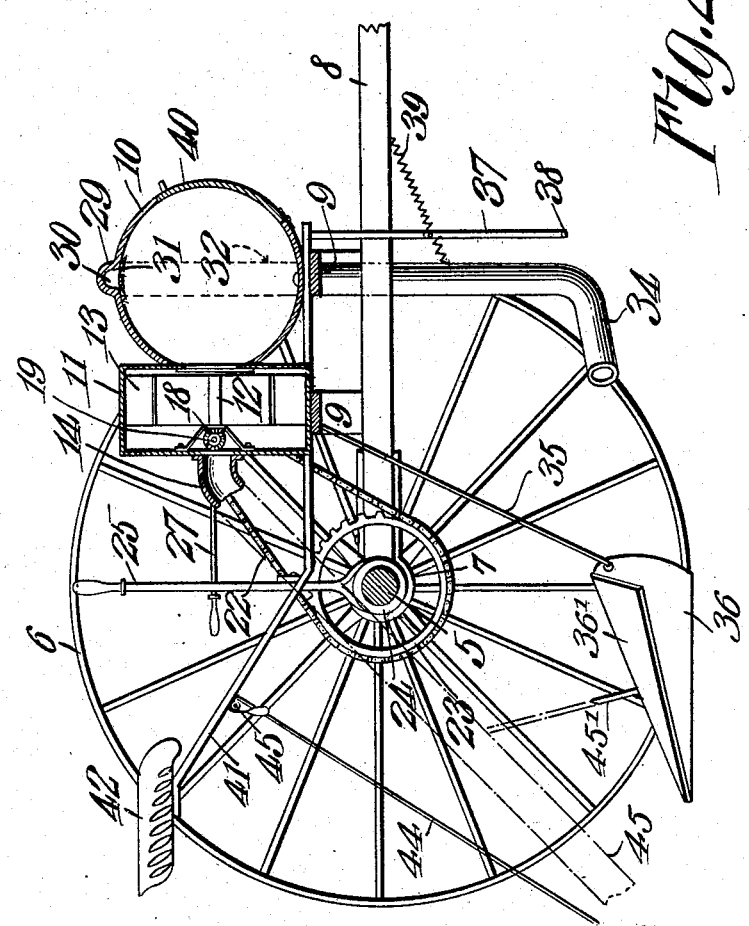

In the accompanying drawings forming a part of this specification: Figure 1 is a perspective view of a machine for destroying insects constructed in accordance with my invention. Fig. 2 is a vertical sectional view of the same.

Similar numerals of reference indicate corresponding parts in all of the figures of the drawings.

The improved machine forming the subject matter of the present invention comprises a wheeled truck including an axle 5 having oppositely disposed traction wheels 6, the latter being keyed to the axle and adjustable longitudinally thereof so that the machine may travel between rows of different widths. Surrounding the axle 5 are spaced sleeves or collars 7, the latter being connected with the shafts or thills 8 and provided with anti-friction balls or rollers thereby to reduce friction between the parts. Extending transversely across the shafts in spaced relation to the axle 5 are supporting bars 9 upon which is mounted a tank or receptacle 10 adapted to receive the affected cotton bolls and squares as the latter are gathered from the ground between the different rows of growing plants.

Mounted on one of the transverse bars 9 is a fan casing 11 having a shaft 12 journaled therein and on which is mounted for rotation a suction fan 13. One side of the fan casing 11 communicates with the interior of the tank or receptacle 10, while the other side thereof is provided with a depending pipe 14 carrying a suction tube 15, the latter being connected with the tube 14 by a flexible coupling member 16.

Secured to the lower end of the depending tube 15 is a suction head or hood 17 preferably conical in shape and into which the dead cotton bolls, squares and insects are drawn and deposited in the receptacle 10 when the fan is rotated. The shaft 12 is provided with a beveled gear 18, which latter meshes with a corresponding beveled gear carried by a counter shaft 19. The counter shaft 19 is journaled in suitable bearings 20 and is provided at its outer end with a sprocket wheel 21, loosely mounted on the shaft 19 and connected through the medium of a sprocket chain 22 with a relatively large sprocket wheel 23 loosely mounted on the axle 5.

Arranged adjacent to the sprocket wheel 23 is a clutch member 24 having a hand operated lever 25 by means of which the sprocket wheel 23 may be clutched to the axle and thereby transmit motion from said axle to the suction fan. A clutch member 26 is also preferably mounted on the shaft 19 for engagement with a corresponding clutch member carried by the sprocket wheel 21 so that the fan may be rotated independently of the axle if desired.

The clutch 26 is provided with an operating lever 27, the intermediate portion of which is pivotally mounted on a standard 28 carried by an arm on the adjacent cross bar 9 and terminates in a suitable finger piece by means of which the lever may be operated to actuate the clutch 26.

The receptacle 10 is provided with an off set portion 29 defining a chamber 30, which latter communicates with the interior of the chamber 10 but is separated therefrom by a strip of wire fabric or other foraminous material 31 so that as the air is forced into the interior of the receptacle 10 by the action of the fan the cotton bolls, squares and insects will strike the strip 31 and be deflected downwardly within the receptacle thereby to prevent the entrance of the same into the compartment 30.

Communicating with the opposite ends of the compartment 30 are tubes 32 having flexible portions 33, the free ends of which are provided with inwardly extending discharge nozzles 34 through which the blast of the air from the fan 13 passes so as to blow any insects or affected cotton squares or bolls from the growing plants as the machine travels between the several rows of said plants.

Depending from one of the bars 9 is a rod or hanger 35 on the lower end of which is pivotally mounted a drag plate or deflector 36, which latter, serves to receive the impact of the cotton bolls and squares as the same are blown from the plants by the action of the blast of air from the discharge nozzles 34. The upper longitudinal edge of the plate 36 is inclined in the direction of the hood 17 and is provided with oppositely disposed downwardly inclined wings 36′ for deflecting the bolls and insects downwardly and in the path of movement of the suction head or hood whereby they may be conveyed to the receptacle 10. Disposed in advance of the deflector 36 are depending rods or shakers 37 having inwardly extending arms 38 which travel over the growing cotton plants and serve to agitate the same and thus assist in dislodging the faulty cotton bolls and squares so that they will be deposited on the ground by the action of the blast of air from the nozzles 34. The flexible portions 33 of the air tubes are normally and yieldably supported in operative position by suitable coiled springs 39 each having one end thereof secured to the tube 33 and its opposite end anchored in any suitable manner to the shafts 8, as shown.

The tank 10 is provided with a pivoted section 40 which latter forms a closure for the tank so that by moving the door 40 to open position the contents of the receptacle may be readily removed thereby to permit the affected cotton bolls and insects to be readily destroyed.

Secured to and extending laterally from one of the transverse bars 9 is an upwardly inclined bar 41 to the free end of which is secured a seat 42 to accommodate the driver. Suitable pawl and ratchet mechanism 43 is also provided for permitting reverse movement of the traction wheels when backing the machine.

As a means for elevating the suction hood or head 17 a cord or cable 44 is provided, one end of which is secured to the head while the opposite end thereof extends over a pulley 45 mounted for rotation on the bar 41 and provided with a terminal finger piece within easy reach of the driver's seat, there being a connection 45′ between the tube 15 and drag plate or deflector 36, whereby said plate and hood may be elevated simultaneously, as shown.

The operation of the device is as follows: The machine is drawn between rows of growing cotton plants with the agitators 38 traveling over the plants of opposite rows and with the nozzles 34 discharging a blast of air against said plants. As the machine travels, motion will be imparted from the axle through the medium of the sprocket chain 22 and shaft 19 to the fan thus rotating the latter and causing the blast of air from the fan to be directed downwardly through the tubes 32 and discharge nozzles 34 onto the plants to dislodge the insects and affected cotton squares and bolls, the plants having been previously agitated by the action of the shakers in the manner before described. The suction created by the fan in the pipe 14 will draw up the insects and affected cotton squares and bolls and deposit the same within the receptacle 10 from which they may be removed and burned or otherwise destroyed after the receptacle is filled or partially filled.

From the foregoing description, it is thought that the construction and operation of the device will be readily understood by those skilled in the art and further description thereof is deemed unnecessary.

Having thus described the invention what is claimed is:

1. A machine of the class described including a wheeled truck, a suction head, a receptacle, a fan operatively connected with the suction head and receptacle, respectively, oppositely disposed air tubes communicating with the interior of the receptacle for discharging a blast of air on each side and in front of the suction head, a deflector disposed between the discharge ends of the air tubes and provided with downwardly inclined wings, and means for operating the fan.

2. A machine of the class described including a wheeled truck, a suction head, a receptacle, a fan operatively connected with the suction head and receptacle, respectively, air tubes communicating with the interior of the receptacle for discharging a blast of air in opposite directions in front of the suction head, a drag plate arranged between the discharge ends of the air tubes and provided with oppositely disposed wings, means for raising and lowering the drag plate, and means for transmitting motion from the axle of the truck of the fan.

3. A machine of the class described including a wheeled truck, a suction head, a receptacle provided with main and auxiliary compartments, a strip of foraminous material separating said compartments, a fan casing connecting the main compartment and suction head, a drag plate arranged in front of the suction head and provided with oppositely disposed wings, tubes communicating with the auxiliary compartment and extending downwardly at the front of the drag plate and provided with terminal nozzles arranged to discharge against said drag plate, a fan operating within the casing, and means for rotating the fan.

4. A machine of the class described including a wheeled truck, a suction head, a tank having main and auxiliary compartments, a screen separating said compartments, a fan casing connecting the suction head and main compartment, air tubes communicating with the auxiliary compartment and having their free ends provided with oppositely disposed discharge nozzles arranged in front of the suction head, a drag plate having its upper longitudinal edge inclined in the direction of the suction head and provided with oppositely disposed wings constituting a deflector, and a fan operating within the casing.

5. A machine of the class described including a wheeled truck, a suction head, a receptacle having main and auxiliary compartments, a strip of foraminous material separating the compartments, a fan casing communicating with the suction head and main compartment, air tubes communicating with the auxiliary compartment and provided with oppositely disposed discharge nozzles, a drag plate depending from the truck in front of the suction head and provided with inclined wings constituting a deflector, a fan operating within the casing, and means for transmitting motion from the axle of the truck to the fan.

6. A machine of the class described including a wheeled truck, a suction head, a receptacle, air tubes having their upper ends communicating with the interior of the receptacle and their lower ends discharging in front of the suction head, a drag plate disposed in front of the suction head and provided with oppositely disposed wings, a fan casing having one side thereof communicating with the interior of the receptacle and its opposite side in communication with the suction head, a fan mounted for rotation in the casing and provided with a shaft one end of which is extended beyond the casing and provided with a sprocket wheel, a sprocket wheel loosely mounted on the axle of the truck, a clutch for operating the sprocket wheel on the axle thereby to transmit motion from the axle to the fan shaft, and a clutch on the fan shaft for moving the adjacent sprocket wheel into and out of gear.

7. A machine of the class described including a wheeled truck, a suction head, a receptacle having main and auxiliary compartments, a screen for separating said compartments, a fan casing having one side thereof communicating with the main compartment and its opposite side communicating with the suction head, a fan mounted for rotation within the casing and provided with a shaft projecting beyond the casing, tubes communicating with the auxiliary compartment and extending downwardly in front of the suction head, said tubes being provided with inwardly extending discharge nozzles, a drag plate arranged adjacent the discharge nozzles and provided with downwardly inclined wings constituting a deflector, and means connecting the axle of the truck and fan shaft for transmitting motion from said axle to the fan shaft.

8. A machine of the class described including a wheeled truck, a receptacle supported on the truck, a suction head, a fan casing connecting the receptacle and suction head, air tubes communicating with the interior of the receptacle and extending downwardly in front of the suction head for discharging a blast of air in opposite directions, a fan operating within the casing, means for transmitting motion from the axle of the truck to the fan for rotating the latter, springs connecting the air tubes and truck for yieldably supporting the discharge ends of said air tubes, and a drag plate depending from the truck between the discharge ends of the air tubes and provided with oppositely disposed downwardly inclined deflecting wings.

In testimony that I claim the foregoing as my own, I have hereto affixed my signature in the presence of two witnesses.

WILEY FAREST NANNEY.

Witnesses:
  H. C. McENTIRE,
  GEO. B. SIMMONS.